(No Model.) 2 Sheets—Sheet 1.
N. BECKWITH.
ELEVATOR.
No. 433,268. Patented July 29, 1890.
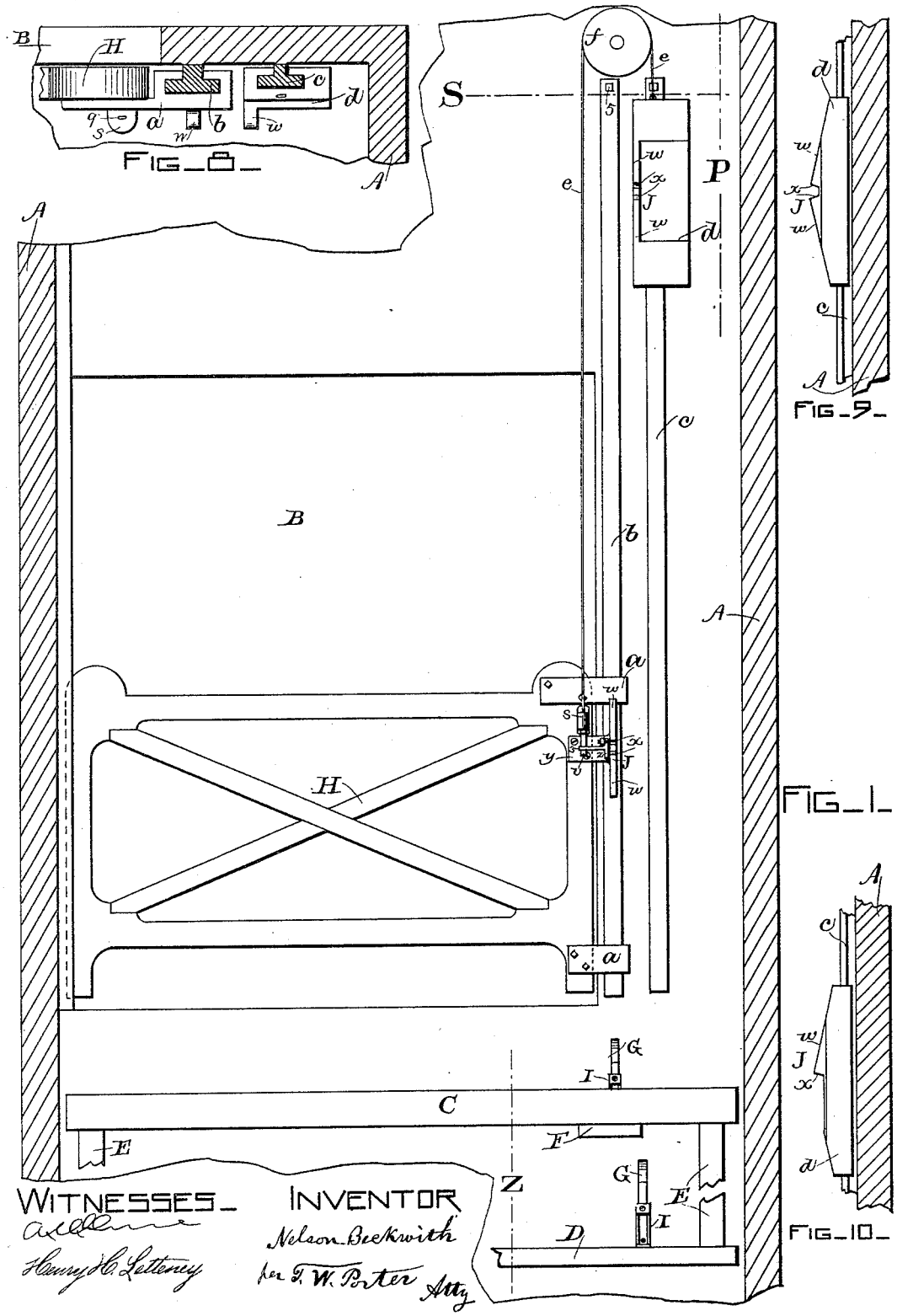
WITNESSES
INVENTOR
Nelson Beckwith
per F. W. Porter Atty (No Model.) 2 Sheets—Sheet 2.
N. BECKWITH.
ELEVATOR.
No. 433,268. Patented July 29, 1890.
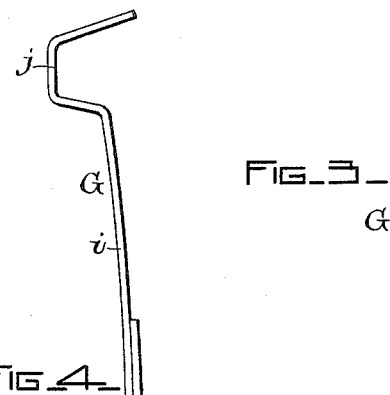
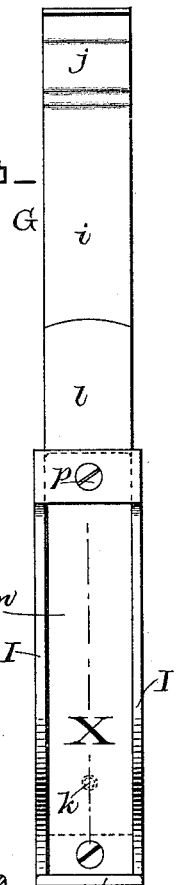
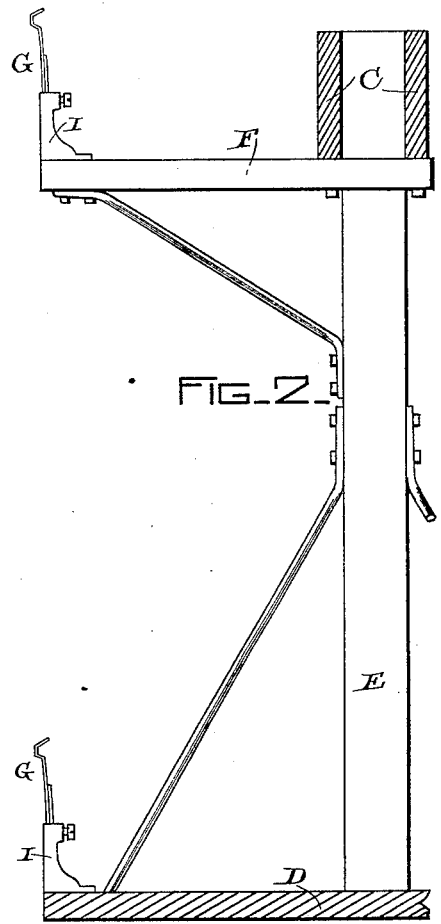
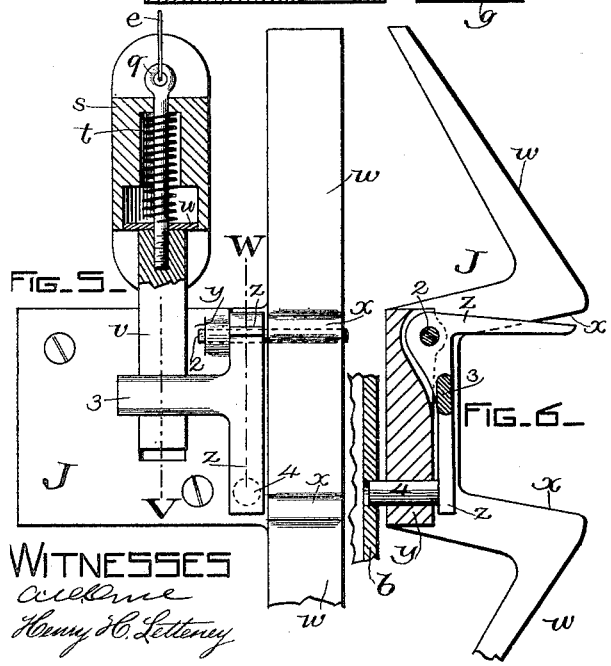
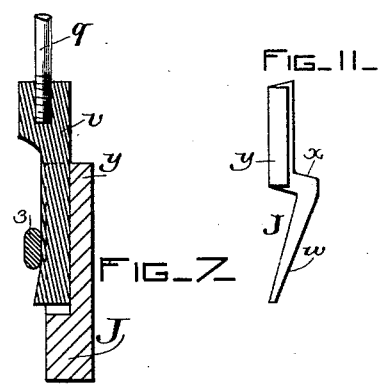
WITNESSES
INVENTOR
Nelson Beckwith
per T. W. Porter Atty

UNITED STATES PATENT OFFICE.

NELSON BECKWITH, OF CAMBRIDGE, MASSACHUSETTS.

ELEVATOR.

SPECIFICATION forming part of Letters Patent No. 433,268, dated July 29, 1890.

Application filed August 10, 1889. Serial No. 320,372. (No model.)

*To all whom it may concern:*

Be it known that I, NELSON BECKWITH, of Cambridge, in the county of Middlesex and State of Massachusetts, have invented a new and useful Improvement in Elevators, which will, in connection with the accompanying drawings, be hereinafter fully described, and specifically defined in the appended claims.

In said drawings, Figure 1 is a sectional elevation, the wall at opposite sides being shown in vertical section and the view being as from the interior of the well, looking out through the open doorway in the well, the guard-gate being shown in its lowest position in connection with its counter-weight, the weight-supporting rope, and the guideways of the gate and rope, the elevator-cage being shown as below the doorway. Fig. 2 is a detached sectional elevation of the cage, the section being taken as on line Z, Fig. 1, and the view as from the left in that figure. Fig. 3 is an enlarged elevation of my improved spring-catch, viewed as in Fig. 1, and as from the right in Fig. 2. Fig. 4 is a central vertical section of said catch, taken on line X, Fig. 3. Fig. 5 is a detached elevation taken as from the right of Fig. 6. Fig. 6 is a sectional elevation, the section being taken as on line W, Fig. 5, and the view as from the left in that figure. Fig. 7 is a partial section on line V, Fig. 5, and the view as from the right in that figure. Fig. 8 is a sectional plan view, the section being taken as on line S, Fig. 1, and the view as from above that line when the gate and counter-weight are both below the line. Fig. 9 is a sectional elevation, the section being taken on line P, Fig. 1, and the view as from the right in that figure. Figs. 10 and 11 show a modification to be referred to.

My invention relates to that class of elevators which are employed to carry freight or passengers from story to story in buildings; and it consists in certain features of novelty in the means by which the movement of the cage will open and close the guard gate or door at the doorways in the wall of the well in due time as the cage approaches and departs to and from said doorways in either its upward or downward movements.

Referring again to said drawings, A represents the wall of the well, in the front side of which is the doorway B. The cross-beam of the cage is shown at C, the floor at D, and the side standards at E, these latter being in Fig. 1 in part broken away to economize space.

As my improvement has no relation to the means by which the cage is raised and lowered, and as it is equally adapted to elevators in which the cage is actuated by a rope or chain or is driven by an endless belt that actuates (through suitable gearing carried by the cage) an endless screw at each side of the cage, which inmesh in a tangent-geared rack attached to standards fixed to the wall at the sides of the cage, or where the cage is driven by a pair of endless screws extending the entire height of the well, and which are driven by coincident gearing and inmesh with tangent-geared racks secured to the sides of the cage, or where the cage is mounted upon the end of a telescopic column, vertically actuated by hydraulic force, or where a rotary column extends the height of the well in the center thereof, and is formed with a deep spiral groove, in which is engaged a trundle carried by the cage, or any of the numerous other means by which power is imparted to the cage to impel it upward and lower it, and as I do not desire to appear to favor either of said means, or to confine my present invention to either, therefore I have not shown either in the drawings, as those who may adopt my invention can with equal facility apply it to any or all such elevators, if the same are already in use, or they can adopt either that their preference or their finances may incline them to select.

To cross-beam C of the cage, at that end next the doorways, I secure an arm F, and to this arm, as also to floor D of the cage, I secure my improved catch G, which consists of a cast-metal frame or standard I, having a base $g$, with a passage $h$ through it to receive a securing-bolt. In said standard I arrange an elastic arm $i$, which at its upper part is formed with an offset or lateral projection $j$, the upper and lower faces whereof are oblique, as shown. I preferably re-enforce arm $i$ with a shorter leaf $l$, both $i$ and $l$ being secured from lineal movement in standard I by a stud $k$, formed on said standard and projecting through a hole in $i$ and $l$.

In order to adjust the lateral resistance of *i*, a reversed leaf *m* is arranged next to *l*, and is acted upon by the screws *n* and *p* for that purpose. The gate H is secured to way *b* by its supporting-irons *a*, as shown in Figs. 1 and 8, while counter-weight *d* is secured to and slides upon way *c*, as is shown in said Figs. 1 and 8. The weight *d* is supported by cord *e*, which passes over sheave *f* and is attached to eyebolt *q* in case *s*, that is secured to the gate, a helical spring *t* being arranged on *q* in the chamber in said case, and at its lower end acts against collar *n*, which rests upon the end of slide *v*, in which the lower end of *q* is secured. I secure to the gate a cam J by means of its ear *y*, said cam being preferably formed of cast metal, and it has the outer inclined faces *w w* and the inner or retiring oblique faces *x x*, between which is space for projection *j* on catch G, and the weight *d* has formed upon or secured to it a cam like that secured to the gate. At one side of the gate-cam I pivot an angle-lever *z* upon pin 2, and to the lower end of said lever I attach a pin 4, which enters a hole in guideway *b*. I form upon the edge of lever *z* a short arm 3, which extends across slide *v*, as shown in Fig. 5.

The operation of my invention is as follows, to wit: The cage being below the doorway, as shown in Fig. 1, and being started upward, the projection of the catch G on arm F will slide up the lower incline *w* of cam J on the gate and will spring into the recess or seat between faces *x x*, and will thereby take the gate along in its course, the upper or horizontal arm of lever *z* being habitually just far enough below the upper face *x* that projection *j* will raise it sufficiently to withdraw pin 4 from guide *b*, thereby leaving the gate free to move. When the gate has been moved to its intended upper limit, it is arrested by a positive stop 5, when projection *j* will slide out of the seat in cam J without shock or injury. Cord *e* is of such length that the catch G on arm F will leave the cam on the gate before the catch on the cage-floor D engages the cam on weight *d*, and hence the cage will pass any doorway before said lower catch engages the cam on said weight *d*, which, when thereby raised, allows the gate to descend, where it is locked, as described. When the cage is descending and engages the weight to move it downward, and thereby raise the gate, the first action of cord *e* is to compress spring *t* by moving eyebolt *q* and its slide *v* upward, and by the same act the outer inclined face of slide *v*, (shown in Fig. 7,) acting against arm 3, moves the lower arm of lever *z* outward, withdrawing pin 4, and thereby unlocking the gate.

When it is desired, as sometimes occurs, to have the apparatus "half-automatic," as it is termed—that is, so that the movement of the cage will not, whether it be ascending or descending, raise the gate, and thereby leave the doorway insecure or unobstructed, but will, when the cage either ascends or descends, close the gate, if it had been previously opened—I form cam J, that is secured to the gate, without the upper faces *w x*, and the cam on weight *d* without the lower faces *w x*, as shown in Figs. 10 and 11. Hence the projection *j* of catches G cannot carry the gate upward when the cage rises, and cannot move the weight *d* downward when the gate descends, and therefore the movement of the cage in either direction will not raise the gate and thereby clear the doorway; but will, when the cage descends by engagement with the cam on the gate, shut the latter down, if it had been previously opened by hand, and if the gate had been previously opened will, when the cage ascends, by engagement with the cam on the weight, raise the latter and allow the gate to descend and close the doorway.

I am aware of United States Patent No. 77,744, dated May 12, 1868, and I claim nothing that is shown or described therein.

I claim as my invention—

1. The combination of the gate supported by a suitable guideway, a guided weight suspended by a cord attached to the gate and duly supported above the latter, cams secured, respectively, to the gate and weight and having both an upper and lower catch-engaging face, and elastic catches respectively arranged at the top and bottom of the cage and in the line of said cams and formed with an upper and lower face adapted to engage said cams when the cage ascends or descends, whereby the gate is both raised and lowered by the positive movement of the cage, substantially as specified.

2. As an improved elevator-catch, the standard of cast metal, a yielding arm having a projection at its upper part to enter the cam-seats, and the adjustable springs provided with adjusting devices, substantially as specified.

3. The combination of the weight-sustaining cord, the cage *s*, its eyebolt *q*, spring *t*, its traveling support, slide *v*, attached to said eyebolt, and angle-lever *z*, carrying locking-pin 4 and engaged with slide *v*, to be actuated thereby, all substantially as specified.

4. In an elevator, the combination of the cams J, having oblique upper and lower contact-faces *x x*, and the yielding catches having upper and lower oblique contact-faces adapted and arranged to engage and coact with said cams, substantially as specified.

NELSON BECKWITH.

Witnesses:
T. W. PORTER,
EUGENE HUMPHREY.